US008245460B2

(12) United States Patent
Yamanaka et al.

(10) Patent No.: US 8,245,460 B2
(45) Date of Patent: Aug. 21, 2012

(54) SUPPORTING CLASP

(75) Inventors: Takayoshi Yamanaka, Takahama (JP);
Joji Tsuzuki, Takahama (JP); Shuichi Kobayashi, Takahama (JP)

(73) Assignee: Yanegijutsukenkyujo Co., Ltd., Takahama-shi (JP)

( * ) Notice: Subject to any disclaimer, the term of this patent is extended or adjusted under 35 U.S.C. 154(b) by 0 days.

(21) Appl. No.: 13/211,770

(22) Filed: Aug. 17, 2011

(65) Prior Publication Data
US 2011/0297808 A1 Dec. 8, 2011

Related U.S. Application Data

(63) Continuation of application No. PCT/JP2009/071525, filed on Dec. 25, 2009.

(30) Foreign Application Priority Data

Apr. 8, 2009 (JP) .................................. 2009-093504

(51) Int. Cl.
*E04D 13/18* (2006.01)
(52) U.S. Cl. ........................ 52/173.3; 126/623; 136/244
(58) Field of Classification Search .................. 52/173.3, 52/506, 5, 543, 511, 698; 126/623; 136/244, 136/251; 248/200.1, 343, 344, 342, 219.3
See application file for complete search history.

(56) References Cited

U.S. PATENT DOCUMENTS

| 2,173,172 | A | * | 9/1939 | Leinen | 248/343 |
|---|---|---|---|---|---|
| 3,190,604 | A | * | 6/1965 | Jorgensen et al. | 248/317 |
| 3,589,660 | A | * | 6/1971 | Dunckel | 248/343 |
| 5,609,317 | A | * | 3/1997 | Glynn et al. | 248/206.5 |
| 6,173,935 | B1 | * | 1/2001 | Gretz | 248/343 |
| 2012/0073220 | A1 | * | 3/2012 | Kobayashi et al. | 52/173.3 |

FOREIGN PATENT DOCUMENTS

| JP | 2003-239471 A | 8/2003 |
|---|---|---|
| JP | 2004-027843 A | 1/2004 |
| JP | 2008-014038 A | 1/2008 |

OTHER PUBLICATIONS

International Search Report for PCT/JP2009/071525, mailing date of Feb. 9, 2010.

* cited by examiner

*Primary Examiner* — Kimberly Wood
(74) *Attorney, Agent, or Firm* — Westerman, Hattori, Daniels & Adrian, LLP

(57) ABSTRACT

A supporting clasp which supports a securing member for securing a roof-installed object to be installed on a roof includes a bottom portion having a substantially rectangular shape which is secured onto a roof material through a base member, plate-form installing pieces which extend to the upper side from two sides of the bottom portion, which are opposed to each other, and which enable the securing member to be installed on upper edges of the installing pieces, and plate-form holding pieces which extend to the upper side from two sides of the bottom portion, which are substantially perpendicular to the two sides from which the installing pieces extend, so as to be higher than the installing pieces, are coupled to the installing pieces in a continuous manner at lower positions with respect to the upper edges of the installing pieces, and are capable of holding the securing member in a state where upper portions of the holding pieces with respect to the installing pieces nip the securing member.

3 Claims, 4 Drawing Sheets

SUPPORTING CLASP

This application is a continuation of International Application No. PCT/JP2009/071525 filed on Dec. 25, 2009 claiming priority upon Japanese Patent Application No. 2009-093504 filed Apr. 8, 2009, of which full contents are incorporated herein by reference.

BACKGROUND OF THE INVENTION

Field of the Invention

The present invention relates to a supporting clasp which supports a securing member for securing a roof-installed object to be installed on a roof.

Conventionally, a roof-installed object (for example, solar cell module, solar water heater, greening body, or the like) is installed on a roof in the following manner. That is, a securing member (frame body, long crosspiece, parallel cross pieces assembled in a form of parallel cross, or the like) for mounting the roof-installed object is made to be supported by a supporting clasp secured onto an upper face of a roof material, and then, the roof-installed object is mounted on the securing member.

As the supporting clasp for supporting the securing member, a supporting clasp 100 as illustrated in FIG. 5A has been known (see, Japanese Patent Application Laid-open No. 2004-027843). The supporting clasp 100 is obtained by integrally forming a pair of leg pieces 101 and a pair of holding pieces 102 on a supporting bulging portion 111 projecting to the upper side from an upper face of a supporting roof tile 110. The pair of leg pieces 101 are fitted onto the supporting bulging portion 111 from the upper side so as to be secured thereto. Along securing member 120 which extends in a tile inclination direction is supportedly fitted into the pair of holding pieces 102 on the leg pieces 101.

The supporting clasp 100 is formed such that the pair of holding pieces 102 into which the securing member 120 is supportedly fitted are erected by simply folding a plate material linearly. Therefore, the supporting clasp 100 has poor bending rigidity. For example, when the supporting clasp 100 supports the securing member 120 which extends in a direction (roof transverse direction) perpendicular to a roof inclination direction, there arises the following problem. That is, in such case, a load tends to act in the direction perpendicular to faces of the holding pieces 102 and the holding pieces 102 are bent due to the load. This causes a problem that the roof-installed object cannot be sufficiently secured through the securing member 120.

In order to solve the problem, a supporting clasp 200 as illustrated in FIG. 5B has been proposed. The supporting clasp 200 includes a substrate portion 211 having a rectangular shape, a pair of installing pieces 212, and a pair of holding pieces 213. The substrate portion 211 is secured onto a base member 201 secured onto an upper face of a roof surface material such as slate, and a roof tile so as to extend diagonally. The pair of installing pieces 212 are erected to the upper side from both edges of the substrate portion 211 in a short-axis direction and a securing member to be supported is installed on the installing pieces 212. The pair of holding pieces 213 are erected to the upper side from both edges of the substrate portion 211 in a long axis direction so as to be higher than the installing pieces 212 and the securing member is supportedly fitted into the holding pieces 213. Further, the pair of installing pieces 212 are erected at positions which are inner side with respect to the holding pieces 213.

In the supporting clasp 200, even if a load acts in the direction perpendicular to faces of the holding pieces 213 so that the holding pieces 213 are about to bend to the inner side, the holding pieces 213 which are about to fall to the inner side can be prevented from falling because the holding pieces 213 abut against ends of the installing pieces 212 in a long-axis direction. Accordingly, even the securing member which extends in the transverse direction of a roof can be sufficiently supported by the supporting clasp 200.

In the conventional supporting clasp 200, the holding pieces 213 can be prevented from falling to the inner side by the installing pieces 212. However, the holding pieces 213 cannot be prevented from falling to the outer side. Therefore, only one holding piece 213 in the pair of holding pieces 213 needs to support the load acting in the direction perpendicular to the faces of the holding pieces 213. Accordingly, there is a risk that the securing member cannot be sufficiently supported depending on a weight of a roof-installed object to be installed on a roof through the securing member and weather conditions such as typhoon, strong wind and accumulated snow. Further, in the conventional supporting clasp 200, there arises the following problem. That is, certain spaces are formed between the ends of the installing pieces 212 in the long-axis direction and the holding pieces 213 for a manufacturing reason. Therefore, a problem that the holding pieces 213 fall to the inner side by an amount of the spaces and the securing member cannot be supported at an accurate position is caused.

SUMMARY OF THE INVENTION

In view of the above circumstances, an object of the present invention is to provide a supporting clasp which can sufficiently support a securing member for securing a roof-installed object even if a large load acts in a direction perpendicular to a direction that the securing member extends.

In order to achieve the above object, a supporting clasp according to an aspect of the invention is "a supporting clasp which supports a securing member for securing a roof-installed object to be installed on a roof including a bottom portion having a substantially rectangular shape which is secured onto a roof material directly or through a predetermined base member, plate-form installing pieces which extend to the upper side from two sides of the bottom portion, which are opposed to each other, and which enable the securing member to be installed on upper edges of the installing pieces, and plate-form holding pieces which extend to the upper side from two sides of the bottom portion, which are substantially perpendicular to the two sides from which the installing pieces extend, so as to be higher than the installing pieces, are coupled to the installing pieces in a continuous manner at lower positions with respect to the upper edges of the installing pieces, and are capable of holding the securing member in a state where upper portions of the holding pieces with respect to the installing pieces nip the securing member, and excretory holes which are arranged on the installing piece and the holding piece at positions extending from the bottom portion and excrete water on the bottom portion, wherein an outer circumference of the supporting clasp at a lower side with respect to the upper edges of the installing pieces is formed into a curved face form".

Here, as a configuration in which "the holding pieces are coupled to the installing pieces in a continuous manner", configurations in which "ends of the holding pieces and the installing pieces are coupled to each other in a curved face form", "ends of the holding pieces and the installing pieces are coupled to each other such that corners are formed on extended lines thereof", and so on can be exemplified. Further, as an expression "coupling", "integral formation", "adhesion by welding or the like", "mechanical coupling with mortise and tenon joint, or the like", and the like can be exemplified.

With the supporting clasp according to the aspect of the invention, two holding pieces which are arranged so as to be perpendicular to two installing pieces of the supporting clasp secured onto a roof material such as a roof tile, slate, or roof board and holds a securing member for securing a roof-installed object such as a solar cell module, a solar water heater, and an on-roof greening body in a nipping manner are coupled to the installing pieces in a continuous manner at lower positions with respect to the upper edges of the installing pieces. Therefore, even if a load acts in the direction perpendicular to faces of the holding pieces from the securing member, the holding pieces can be supported so as not to fall with the portions thereof coupling to the installing pieces. This makes it possible to prevent the holding pieces from bending.

The holding pieces are supported so as not to fall with the portions thereof coupling to the installing pieces. Therefore, even if a load which causes the holding pieces to fall to the inner side or the outer side acts on the holding pieces, the holding piece can be prevented from bending. Accordingly, both of the two holding pieces which hold the securing member in the nipping manner can stand against the load acting in the direction perpendicular to the faces of the holding pieces (in the direction perpendicular to the direction that the securing member extends). Therefore, the two holding pieces can firmly support the securing member in comparison with the conventional technique. That is to say, even if a large load acts in the direction perpendicular to the direction that the securing member extends (in the direction perpendicular to the faces of the holding pieces) through the securing member depending on a weight of a roof-installed object to be installed on a roof and weather conditions such as typhoon, strong wind and accumulated snow, the securing member can be sufficiently supported.

As described above, if a large load acts in the direction perpendicular to the direction that the securing member extends, the securing member can be sufficiently supported. Therefore, not only the securing member extending in an inclination direction of a roof but also the securing member extending in a direction perpendicular to the inclination direction of the roof (transverse direction of the roof) can be also sufficiently supported. Accordingly, one supporting clasp can be made to correspond to the securing members extending in the inclination direction and the transverse direction of the roof. This makes it possible to reduce the number of parts required to install the roof-installed object and reduce the cost.

Further, the supporting clasp according to the aspect of the invention may further include "excretory holes which are arranged on the installing piece and the holding piece at positions extending from the bottom portion and excrete water on the bottom portion", in addition to the above configuration.

According to the aspect to the invention, the excretory holes are provided on the installing piece and the holding piece at positions extending from the bottom portion. Therefore, rainwater and the like which has entered on the bottom portion, that is, the supporting clasp can be excreted to the outside through the excretory holes. Accordingly, corrosion of the supporting clasp due to accumulation of water and strange odor due to decomposition of accumulated water can be prevented from being caused.

Further, in the supporting clasp according to the aspect of the invention, "an outer circumference of the supporting clasp at a lower side with respect to the upper edges of the installing pieces may be formed into a curved face form", in addition to the above configuration.

According to the aspect to the invention, the holding pieces and the installing pieces are smoothly coupled to each other such that portions coupling them are formed into a curved face form. Therefore, corners on which stress is focused can be eliminated so that load resistance against the load acting in the direction perpendicular to the faces of the holding pieces can be further enhanced.

If an outer circumferential shape of the supporting clasp at the lower side with respect to the upper edges of the installing pieces is set to such shape that ends of the holding pieces and the installing pieces form corners on extended lines thereof, when, for example, a method of manufacturing the supporting clasp by plastically deforming one plate material with a pressing processing or the like is employed as a method of manufacturing the supporting clasp, the plate member needs to be extended sufficiently. Therefore, there arises a problem that the pressing processes are increased and cost required to manufacture the supporting clasp is increased. However, in the aspect of the invention, an outer circumference of the supporting clasp at the lower side with respect to the upper edges of the installing pieces is formed into a curved face form. Therefore, when the supporting clasp is shaped by plastically deforming one plate material with a pressing processing or the like, the supporting clasp can be manufactured with reduced pressing processes so that cost required to manufacture the supporting clasp can be reduced.

Further, in the supporting clasp according to the aspect of the invention, "when the supporting clasp is mounted on a roof material, the supporting clasp may be secured onto the roof material through a base member having an outer circumferential shape which makes it possible to guide water flowing down on the roof material to the outer side and the downstream side", in addition to the above configuration. Here, as the "outer circumferential shape which makes it possible to guide to the outer side and the downstream side", "a polygonal shape such as a triangular shape or a square shape when seen from the above, which enables the base member to be mounted on a roof material such that one top is located at the highest position at the ridge side on the roof material", "a circular shape", "an elliptical shape", and the like can be exemplified.

According to the aspect of the invention, when the supporting clasp is secured onto the roof material through the base member, the outer circumferential shape of the base member is a shape which makes it possible to guide rainwater and the like flowing down on the roof material to the outer side and the downstream (eaves) side. Therefore, if the base member is mounted, rainwater and the like can be prevented from stagnating. In addition, if rainwater and the like can be prevented from stagnating, the base member, the supporting clasp, and the like can be prevented from being corroded and rainwater and the like flowing down the securing screw for mounting the base member on the roof material can be prevented from entering the back side of the roof material.

DETAILED DESCRIPTION OF THE PREFERRED EMBODIMENTS

Figure 1A:
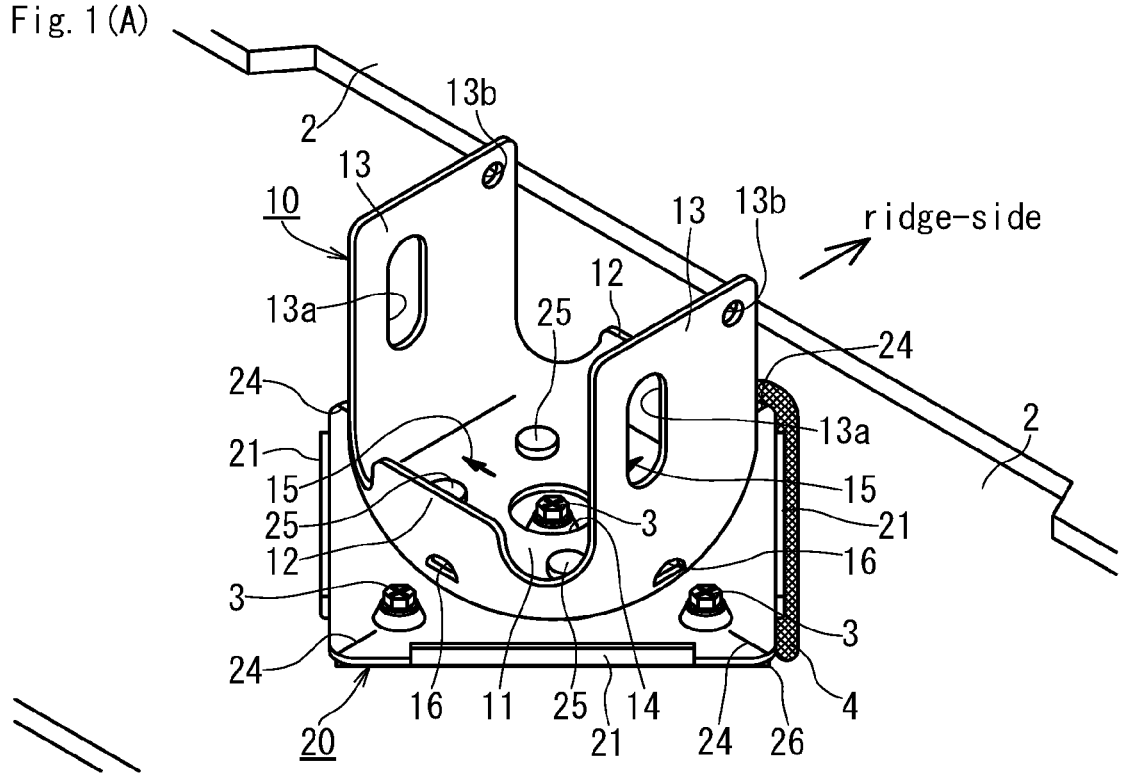
FIG. 1A is a perspective view illustrating a state where a supporting clasp as an example of the invention is secured onto a roof material through a base member so as to support a securing member extending in the inclination direction of a roof.
Figure 1B:
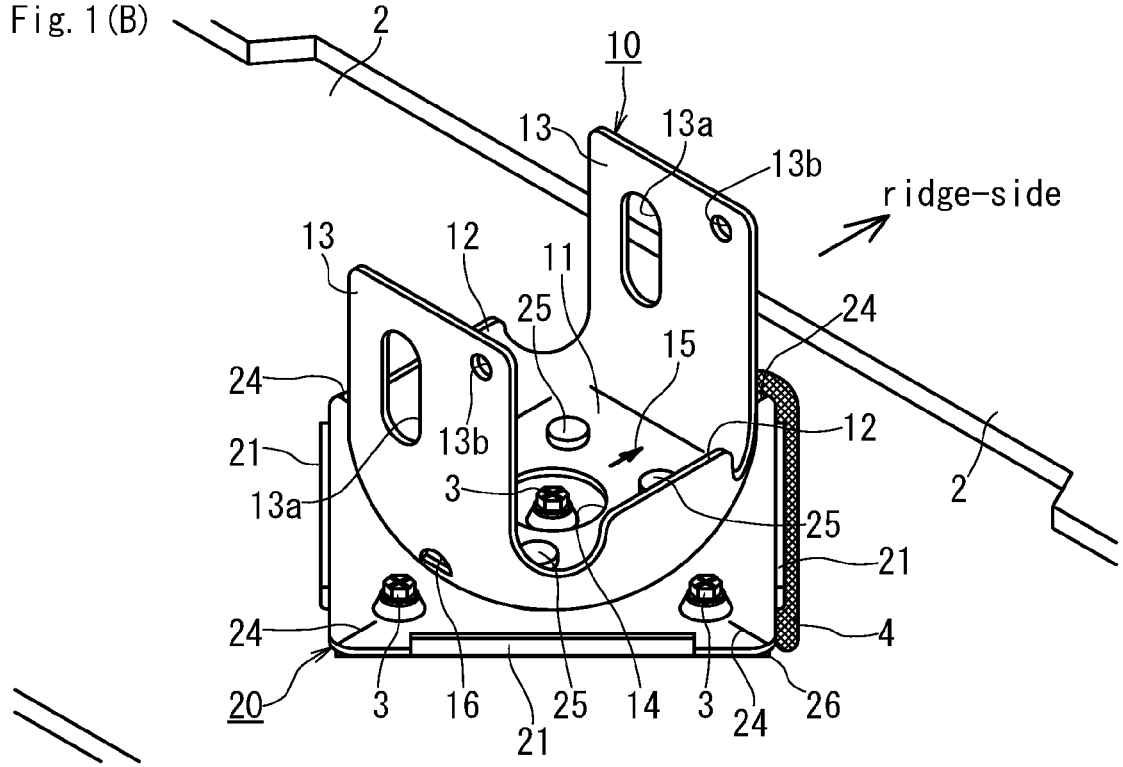
FIG. 1B is a perspective view illustrating a state where the supporting clasp of FIG. 1A is secured onto the roof material so as to support a securing member extending in the transverse direction of the roof.
Figure 2:
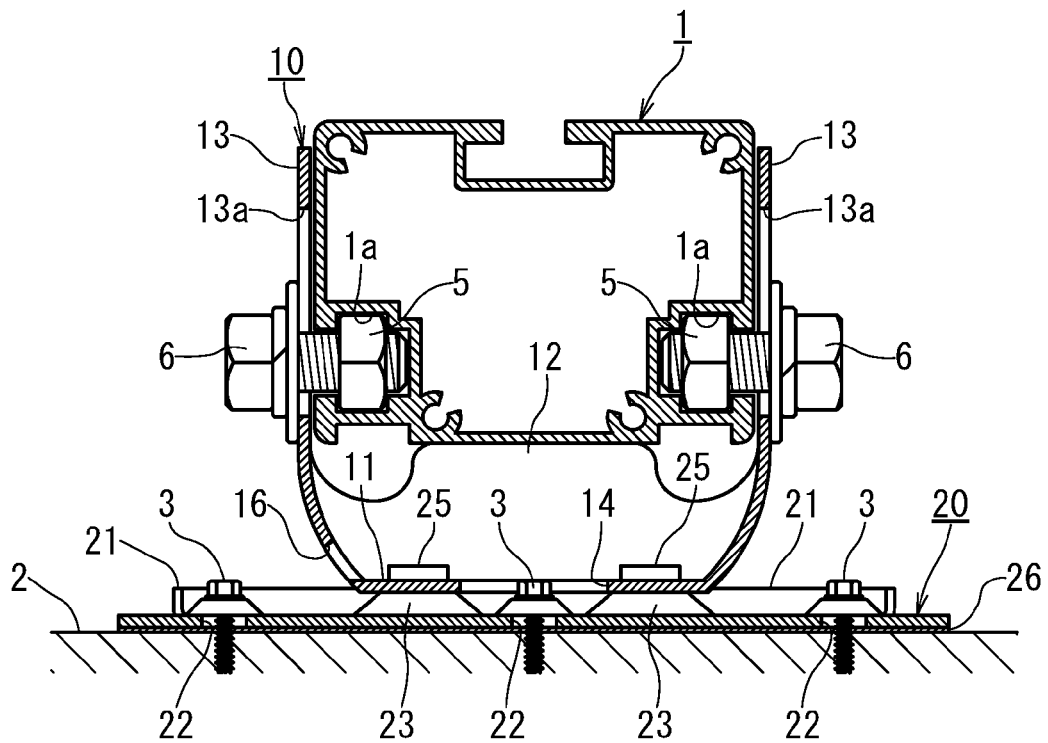
FIG. 2 is a cross-sectional view illustrating a state where the securing member is supported on the roof material by the supporting clasp of FIGS. 1A and 1B.
Figure 3:
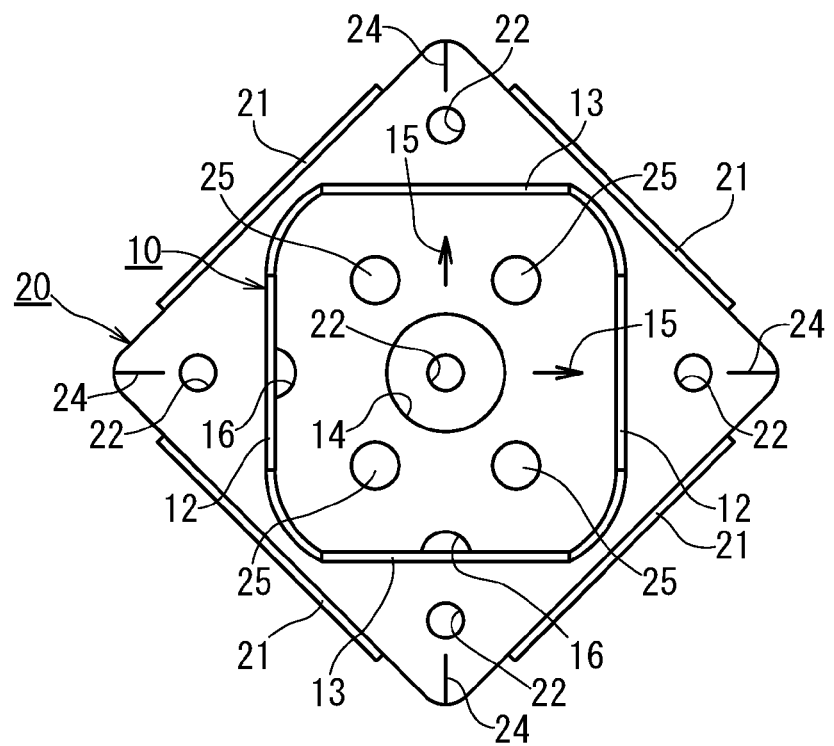
FIG. 3 is a plan view illustrating the supporting clasp of FIGS. 1A and 1B together with the base member.

A supporting clasp which supports a securing member for securing a roof-installed object as an embodiment of the invention is described in detail with reference to FIG. 1A through FIG. 3. FIG. 1A is a perspective view illustrating a state where a supporting clasp as an example of the invention is secured onto a roof material through a base member so as to support a securing member extending in the inclination direction of a roof. FIG. 1B is a perspective view illustrating a state where the supporting clasp of FIG. 1A is secured onto the roof material so as to support a securing member extending in the transverse direction of the roof. FIG. 2 is a cross-sectional view illustrating a state where the securing member is supported on the roof material by the supporting clasp of FIGS. 1A and 1B. FIG. 3 is a plan view illustrating the supporting clasp of FIGS. 1A and 1B together with the base member.

A supporting clasp 10 according to the embodiment supports a securing member 1 for securing a roof-installed object (not illustrated) such as a solar cell module, a solar water heater or an on-roof greening body to be installed on the roof. The supporting clasp 10 includes a substantially rectangular-shaped bottom portion 11, plate-form installing pieces 12, and plate-form holding pieces 13. The bottom portion 11 is secured onto a roof material 2 formed by slate through a base member 20. The installing pieces 12 extend to the upper side from two sides of the bottom portion 11, which are opposed to each other, and the securing member 1 can be installed on upper edges of the installing pieces 12. The holding pieces 13 extend to the upper side from two sides of the bottom portion 11, which are substantially perpendicular to the two sides of the bottom portion 11 from which the installing pieces 12 extend. The holding pieces 13 extend so as to be higher than the installing pieces 12. The holding pieces 13 are coupled to the installing pieces 12 in a continuous manner at lower positions with respect to the upper edges of the installing pieces 12. Further, the holding pieces 13 can hold the securing member 1 such that upper portions of the holding pieces 13 with respect to the installing pieces 12 nip the securing member 1.

The base member 20 assembled on the lower side of the supporting clasp 10 is formed into a substantially square shaped plate form when seen from the above. The base member 20 includes erected portions 21, securing holes 22, four mounting boss portions 23, and marking portions 24. The erected portions 21 are erected to the upper side by a predetermined amount on four sides. The securing holes 22 are provided on four corners on diagonal lines and an intersection of the diagonal lines and securing screws 3 for securing the base member 20 onto the roof material 2 can be inserted into the securing holes 22. The mounting boss portions 23 are arranged so as to surround the securing hole 22 at the center and project to the upper side by a predetermined amount. The marking portions 24 are formed on an upper face of the base member 20 at four corners along the diagonal lines. The entire rigidity of the base member 20 is enhanced with the erected portions 21 on the four sides. Further, the supporting clasp 10 is assembled onto the four mounting boss portions 23 with rivets 25 so that the supporting clasp 10 can be secured at a position raised from an upper face of the roof material 2 by a predetermined amount. It is to be noted that a waterproof member 26 having a predetermined thickness, which is formed by natural rubber, synthetic rubber, silicone rubber, or the like is bonded to a lower face of the base member 20 (see, FIG. 2).

The supporting clasp 10 in the embodiment further includes an opening 14, arrow-form discrimination portions 15, and excretory holes 16. The opening 14 is provided at a substantially center of the bottom portion 11 and has such size that the securing screw 3 can sufficiently pass therethrough. The arrow-form discrimination portions 15 are arranged on the upper face of the bottom portion 11 so as to point toward one installing piece 12 and one holding piece 13, respectively. The excretory holes 16 are formed on the installing piece 12 and the holding piece 13 at positions extending from the bottom portion 11 at the sides opposite to the sides to which the discrimination portions 15 point. Water on the bottom portion 11 can be excreted from the excretory holes 16. The supporting clasp 10 is secured onto the roof material 2 such that the arrows of the discrimination portions 15 point toward a ridge side of the roof. With this, water on the bottom portion 11 can be reliably excreted from the excretory holes 16 formed at the sides opposite to the discrimination portions 15. In addition, in the supporting clasp 10, long holes 13a extending in the vertical direction and circular retaining holes 13b are formed on the holding pieces 13 at positions higher than the upper edges of the installing pieces 12 so as to penetrate through the holding pieces 13. It is to be noted that the excretory holes 16 may be also formed at the sides of the discrimination portions 15. With this, construction performance of the supporting clasp 10 can be improved.

As illustrated in the drawings, in the supporting clasp 10 in the embodiment, ends of the installing pieces 12 and the holding pieces 13 are coupled to each other in a continuous manner in a curved face form at lower positions with respect to the upper edges of the installing pieces 12. At this time, an outer circumference of the supporting clasp 10 at the lower side with respect to the upper edges of the installing pieces 12 is formed into a curved face form. Further, portions at which the installing pieces 12 and the holding pieces 13 are coupled to each other in the curved face form are formed into circular arc-form cut-out shapes so as to be lower than the upper edges of the installing pieces 12 such that the securing member 1 to be installed on the installing pieces 12 does not make contact with the portions.

The supporting clasp 10 is mounted and secured onto the base member 20 with the rivets 25 such that centers of two installing pieces 12 and two holding pieces 13 in the width direction are located on diagonal lines of the base member 20. It is to be noted that a method of mounting and securing the supporting clasp 10 onto the base member 20 is not limited to the method using the rivets 25. For example, welding securing, fastening securing with a bolt and a nut, or engagement securing using predetermined engagement members or an engagement mechanism may be employed for mounting and securing the supporting clasp 10 onto the base member 20. Further, the supporting clasp 10 and the base member 20 in the embodiment are formed by a sheet metal having a predetermined thickness, such as a plated steel sheet having high corrosion resistance or a stainless steel. In addition, the supporting clasp 10 is shaped by plastically deforming one plate material with a pressing processing.

Next, a construction method for supporting the securing member 1 using the supporting clasp 10 in the embodiment is described. The supporting clasp 10 in the embodiment is made into a state of being previously assembled on the base member 20. Although not illustrated in the drawings, a viscous layer is formed on a lower face of the waterproof member 26 bonded to the lower face of the base member 20. Further, an exfoliate paper is bonded to the lower face of the waterproof member 26 so as to cover the viscous layer. At first, mark-off lines along the inclination and transverse directions of the roof are formed on an upper face of the roof material 2 at positions at which the supporting clasp 10 is secured (at a position at which the securing member is arranged).

Subsequently, the exfoliate paper bonded to the lower face of the base member 20 is peeled and the supporting clasp 10 and the base member 20 are bonded to the upper face of the roof material 2. To be more specific, the supporting clasp 10 and the base member 20 are bonded to the upper face of the roof material 2 such that the marking portions 24 of the base member 20 substantially match with the mark-off lines. At this time, the supporting clasp 10 and the base member 20 are bonded thereto such that the securing member 1 is nipped by the two holding pieces 13 along the direction that the securing member 2 to be supported extends and the arrows of the corresponding discrimination portions 15 on the bottom portion 11 point toward the ridge side. In the state where the supporting clasp 10 and the base member 20 are bonded to the upper face of the roof material 2 in the above manner, the securing screws 3 are screwed into the roof material 2 through the securing holes 22 of the base member 20. With this, the base member 20 and the supporting clasp 10 are secured onto the roof material 2.

After the supporting clasp 10 has been secured onto the roof material 2 through the base member 20, a predetermined caulking material 4 is coated at least on outer circumferences of two sides of the base member 20, which direct to the ridge side. With this, rainwater and the like can be prevented from entering through the securing screws 3 from between the roof material 2 and the base member 20. In addition, rainwater and the like can be guided to both of the left and right sides of the base member 20 by the two sides directing to the ridge side so as to be excreted to the eaves side preferably. In such manner, the securing member 1 is installed on the upper edges of the two installing pieces 12 after the securing member 1 has been inserted into between the two holding pieces 13 on the supporting clasp 10 mounted on the roof material 2. Then, bolts 6 are fastened to nuts 5 held on nut holding portions 1a at the left and right portions of the securing member 1 from the other sides through the long holes 13a of the holding pieces 13. With this, the securing member 1 is made into a state of being supported by the supporting clasp 10 so that construction of the securing member 1 for securing the roof-installed object is completed (see, FIG. 2).

It is to be noted that when the long securing member 1 is supported by a plurality of supporting clasps 10, relative heights of the supporting clasps 10 with respect to the securing member 1 are made different from each other depending on differences and deviations of positions at which the supporting clasps 10 are mounted on the roof material 2 through the base members 20, types and inclination angles of the roof material 2, and the like in some case. However, a position at which the securing member 1 is supported can be adjusted by the long holes 13a of the holding pieces 13 so that the securing member 1 can be supported straightly. Further, if predetermined screws are screwed into the securing member 1 through the retaining holes 13b of the holding pieces 13, the securing member 1 is made into a state of being prevented from moving in the longitudinal direction thereof and the upper direction with respect to the supporting clasps 10. Therefore, the securing member 1 can be prevented from deviating with respect to the supporting clasps 10.

As described above, with the supporting clasp 10 according to the embodiment, the two holding pieces 13 which are arranged so as to be perpendicular to the two installing pieces 12 of the supporting clasp 10 secured onto the roof material 2 and hold the securing member 1 for securing a roof-installed object in a nipping manner are coupled to the installing pieces 12 in a continuous manner at the lower positions with respect to the upper edges of the installing pieces 12. Therefore, even if a load acts in the direction perpendicular to the faces of the holding pieces 13 from the securing member 1, the holding pieces 13 are supported so as not to fall with the portions thereof coupling to the installing pieces 12. This makes it possible to prevent the holding pieces 13 from bending.

The holding pieces 13 are supported so as not to fall with the portions thereof coupling to the installing pieces 12. Therefore, even if a load which causes the holding pieces 13 to fall to the inner side or the outer side acts on the holding pieces 13, the holding piece 13 can be prevented from bending. Accordingly, both of the two holding pieces 13 which hold the securing member 1 in the nipping manner can stand against the load acting in the direction perpendicular to the direction that the securing member 1 extends. Therefore, the two holding pieces 13 can firmly support the securing member 1 in comparison with the conventional technique. That is to say, even if a large load acts in the direction perpendicular to the direction that the securing member 1 extends through the securing member 1 depending on a weight of a roof-installed object to be installed on a roof and weather conditions such as typhoon, strong wind and accumulated snow, the securing member 1 can be sufficiently supported.

As described above, even if a large load acts in the direction perpendicular to the direction that the securing member 1 extends, the securing member 1 can be sufficiently supported. Therefore, not only the securing member 1 extending in the inclination direction of the roof but also the securing member 1 extending in the direction (transverse direction of the roof) perpendicular to the inclination direction of the roof can be also sufficiently supported. Accordingly, one supporting clasp 10 can be made to correspond to the securing members 1 extending in the inclination direction and the transverse direction of the roof. This makes it possible to reduce the number of parts required to install the roof-installed object and reduce the cost.

Further, the excretory holes 16 are provided on the installing piece 12 and the holding piece 13 at positions extending from the bottom portion 11. Therefore, rainwater and the like which has entered on the bottom portion 11, that is, the supporting clasp 10 can be excreted to the outside through the excretory holes 16. Accordingly, corrosion of the supporting clasp 10 due to accumulation of water and strange odor due to decomposition of accumulated water can be prevented from being caused.

In addition, the holding pieces 13 and the installing pieces 12 are smoothly coupled to each other such that portions coupling them are formed into a curved face form. Therefore, corners on which stress is focused can be eliminated so that load resistance against the load acting in the direction perpendicular to the faces of the holding pieces 13 can be enhanced. Further, the outer circumference of the supporting clasp 10 at the lower side with respect to the upper edges of the installing pieces 12 is formed into the curved face form. Therefore, when the supporting clasp 10 is shaped by plastically deforming one plate material with a pressing processing or the like, the supporting clasp 10 can be manufactured with reduced pressing processes so that cost required to manufacture the supporting clasp 10 can be reduced.

Hereinbefore, the invention has been described by using a preferred embodiment. However, the invention is not limited to the embodiment. As will be described below, various improvements and changes in design can be made within a range without departing from a scope of the invention.

That is to say, in the above embodiment, the supporting clasp 10 is mounted on the upper face of the roof material 2 through the base member 20. However, the invention is not limited to the configuration. For example, the supporting clasp 10 may be secured onto the upper face of the roof material 2 directly without through the base member 20. With this configuration, action effects which are the same as those obtained in the above embodiment can be also obtained. Further, when the supporting clasp 10 is mounted on the roof material 2 directly, it is desirable that a waterproof member having waterproof property and a predetermined thickness is provided between the supporting clasp 10 and the roof material 2.

Figure 4A:
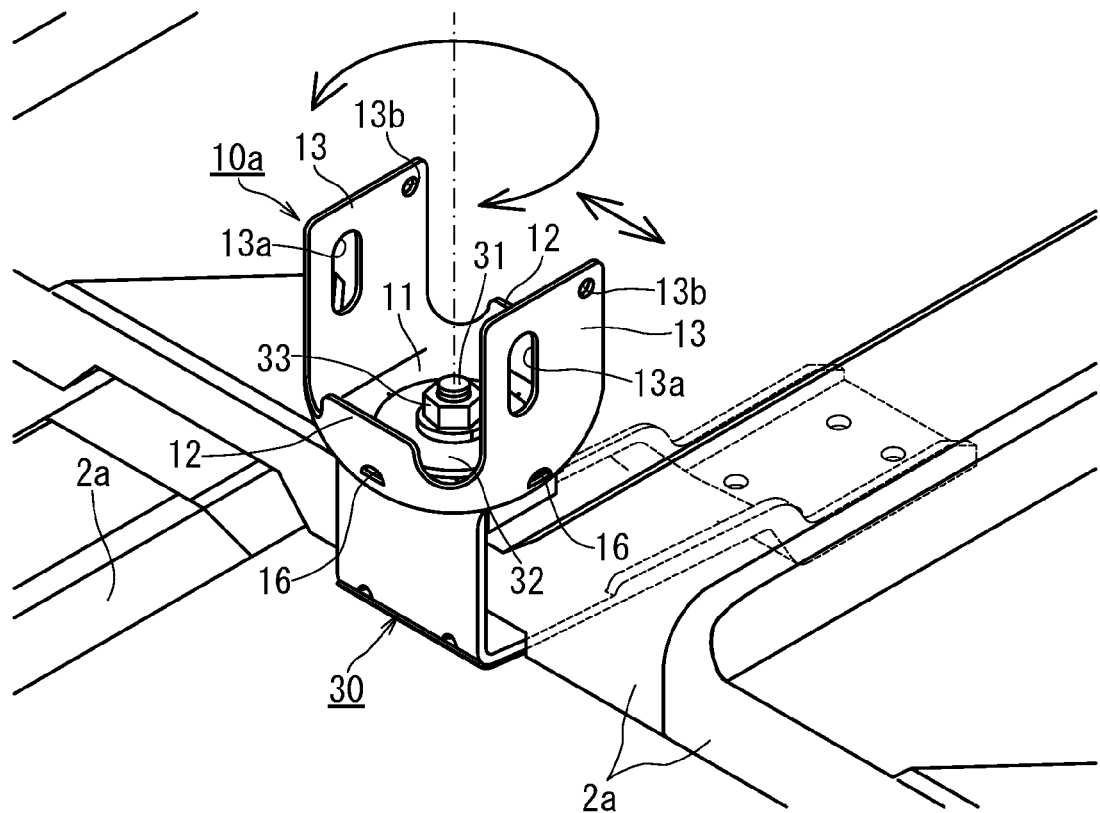
FIG. 4A is a perspective view illustrating a state where a supporting clasp as an example different from FIGS. 1A and 1B is secured onto the roof material through a base member.
Figure 4B:
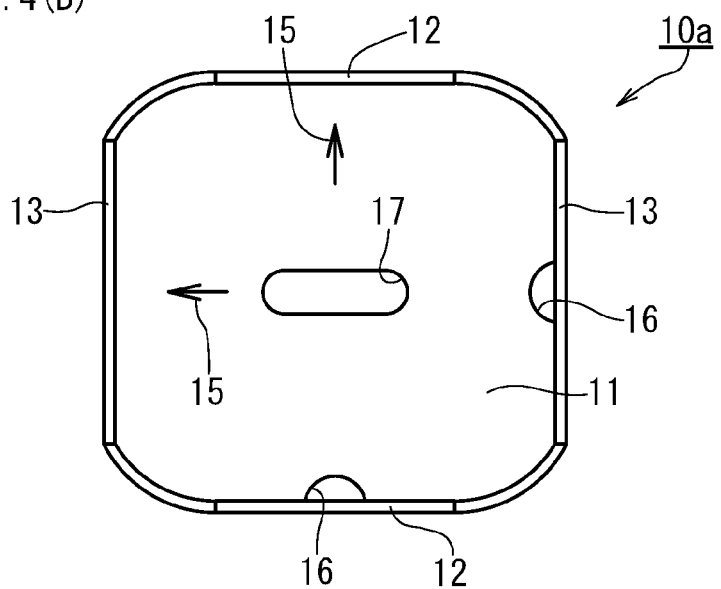
FIG. 4B is a plan view illustrating the supporting clasp of FIG. 4A.
Figure 5A:
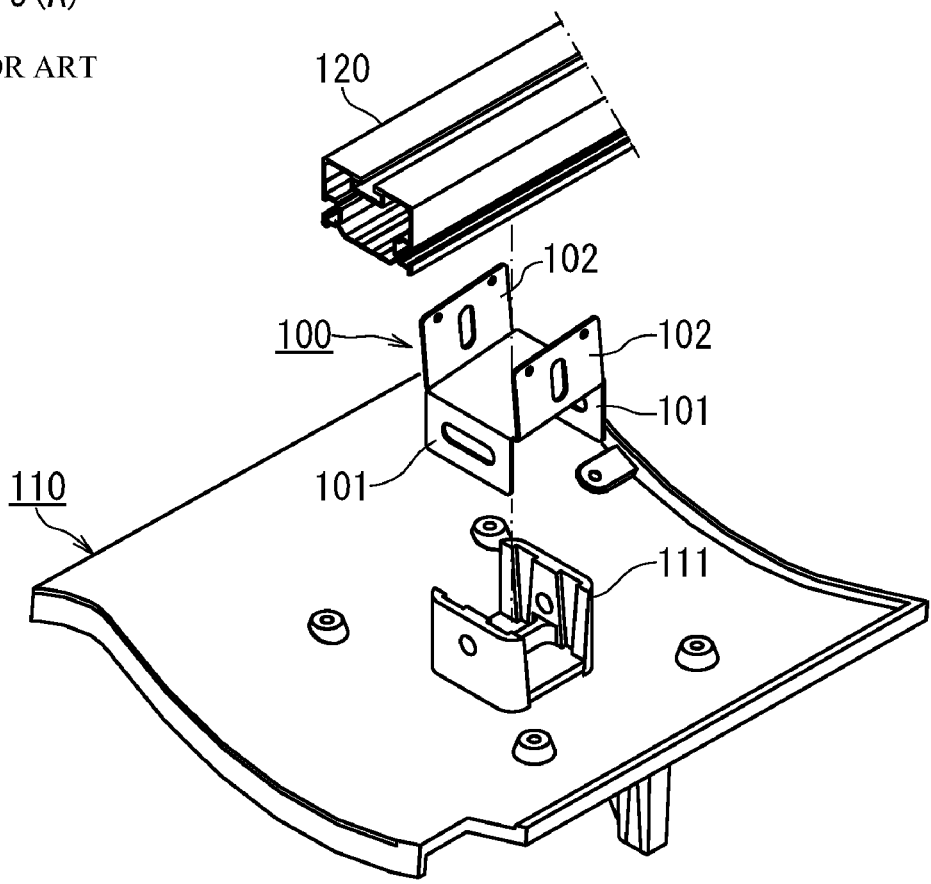
FIG. 5A is a perspective view illustrating a conventional supporting clasp.
Figure 5B:
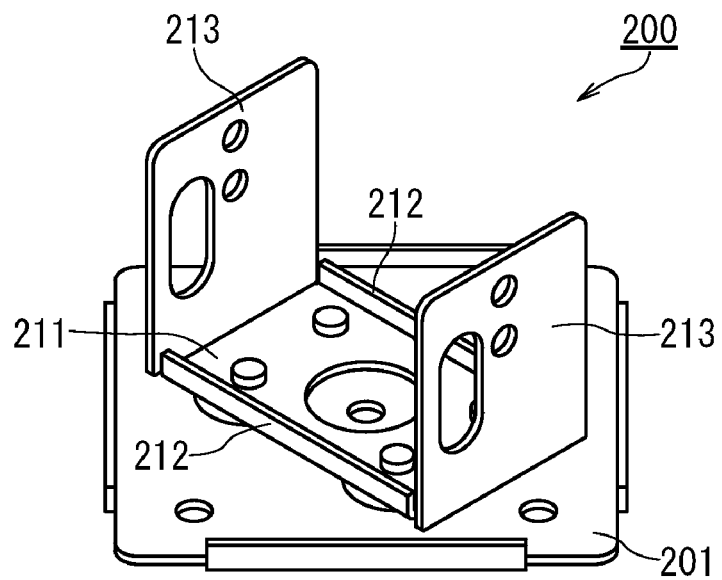
FIG. 5B is a perspective view illustrating another conventional supporting clasp.

Further, in the above embodiment, the supporting clasp 10 is mounted through the base member 20 secured onto the upper face of a roof surface material such as slate as the roof material 2. However, the invention is not limited to the configuration. For example, as illustrated in FIG. 4A, a supporting clasp 10a may be mounted through a base member 30 of which one end is secured to a roofboard or the like as the roof material 2 and the other end extends onto the roof through a space between roof tiles 2a as the roof material 2. As illustrated in FIG. 4B, the supporting clasp 10a includes a long mounting hole 17 at a center of the bottom portion 11. A mounting bolt 31 extending to the upper side from the other end of the base member 30 can pass through the mounting hole 17. The supporting clasp 10a can be mounted on the base member 30 by threadably mounting a mounting nut 33 on the mounting bolt 31 projecting into the supporting clasp 10a through the mounting hole 17 while a mounting washer 32 is provided to be sandwiched therebetween. It is to be noted that the same reference numerals denote parts having the same configurations as those in the above embodiment and description is not repeated.

The supporting clasp 10a can rotate about the mounting bolt 31 with respect to the base member 30 and can slide in a range of the mounting hole 17 in the direction perpendicular to the faces of the holding pieces 13. Therefore, the securing member 1 can be supported when the securing member 1 extends in any directions of the inclination direction and the transverse direction of the roof. Further, even if the mounting position of the base member 30 on the roof material is deviated or the base member can be mounted only on the deviated position, the securing member 1 can be reliably supported by sliding the supporting clasp 10a.

As described above, according to the invention, a supporting clasp which can sufficiently support a securing member even if a large load acts in the direction perpendicular to the direction that the securing member for securing a roof-installed object extends can be provided.

What is claimed is:

1. A supporting clasp which supports a securing member for securing a roof-installed object to be installed on a roof comprising:
    a bottom portion having a substantially rectangular shape which is secured onto a roof material directly or through a predetermined base member;
    plate-form installing pieces which extend to the upper side from two sides of the bottom portion, which are opposed to each other, and which enable the securing member to be installed on upper edges of the installing pieces;
    plate-form holding pieces which extend to the upper side from two sides of the bottom portion, which are substantially perpendicular to the two sides from which the installing pieces extend, so as to be higher than the installing pieces, are coupled to the installing pieces in a continuous manner at lower positions with respect to the upper edges of the installing pieces, and are capable of holding the securing member in a state where upper portions of the holding pieces with respect to the installing pieces nip the securing member; and
    excretory holes which are arranged on the installing piece and the holding piece at positions extending from the bottom portion and excrete water on the bottom portion,
    wherein an outer circumference of the supporting clasp at a lower side with respect to the upper edges of the installing pieces is formed into a curved face form.

2. The supporting clasp according to claim 1,
    wherein when the supporting clasp is mounted on a roof material, the supporting clasp is secured onto the roof material through a base member having an outer circumferential shape which makes it possible to guide water flowing down on the roof material to the outer side and the downstream side.

3. The supporting clasp according to claim 1, further including arrow-form discrimination portions which are arranged on an upper face of the bottom portion so as to point toward one installing piece and one holding piece,
    wherein the excretory holes are formed on the installing piece and the holding piece at positions extending from the bottom portion at the sides opposite to the sides to which the discrimination portions point.

* * * * *